United States Patent
Manabe

(10) Patent No.: US 8,125,696 B2
(45) Date of Patent: Feb. 28, 2012

(54) COLOR PROCESSING APPARATUS AND METHOD THEREOF

(75) Inventor: Yoshihiro Manabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 706 days.

(21) Appl. No.: 12/198,205

(22) Filed: Aug. 26, 2008

(65) Prior Publication Data

US 2009/0067016 A1 Mar. 12, 2009

(30) Foreign Application Priority Data

Sep. 12, 2007 (JP) ................. 2007-237260

(51) Int. Cl.
- *G03F 3/08* (2006.01)
- *H04N 1/60* (2006.01)
- *G06K 9/00* (2006.01)

(52) U.S. Cl. .......... 358/518; 358/1.9; 358/523; 382/167

(58) Field of Classification Search .................. 358/518, 358/520, 523, 524, 530, 535, 1.9, 3.27, 517, 358/519, 504; 382/167, 162

See application file for complete search history.

(56) References Cited

U.S. PATENT DOCUMENTS

| | | | |
|---|---|---|---|
| 6,791,716 B1 * | 9/2004 | Buhr et al. ................ | 358/1.9 |
| 6,961,461 B2 * | 11/2005 | MacKinnon et al. ....... | 382/164 |
| 6,980,231 B1 * | 12/2005 | Ohsawa ..................... | 348/188 |
| 7,236,195 B2 * | 6/2007 | Quan et al. ................ | 348/273 |
| 7,433,102 B2 * | 10/2008 | Takahashi et al. .......... | 358/518 |
| 7,450,158 B2 * | 11/2008 | Ohsawa et al. ............ | 348/222.1 |
| 7,529,006 B2 * | 5/2009 | Itagaki et al. .............. | 358/519 |
| 7,880,772 B2 * | 2/2011 | Nagano et al. ............ | 348/223.1 |
| 2002/0012461 A1 * | 1/2002 | MacKinnon et al. ....... | 382/164 |
| 2004/0263638 A1 * | 12/2004 | Ohsawa et al. ............ | 348/222.1 |
| 2006/0061841 A1 * | 3/2006 | Osawa et al. .............. | 358/518 |
| 2006/0280360 A1 * | 12/2006 | Holub ....................... | 382/162 |
| 2007/0268377 A1 * | 11/2007 | Nagano et al. ............ | 348/222.1 |
| 2009/0141976 A1 * | 6/2009 | Tsukada ..................... | 382/167 |

* cited by examiner

*Primary Examiner* — Madelein A Nguyen

(74) *Attorney, Agent, or Firm* — Fitzpatrick, Cella, Harper & Scinto

(57) ABSTRACT

Differences in color appearance due to the individual differences in color matching functions are corrected. Hence, a spectral data obtaining unit inputs spectral image data. A color matching function setting unit sets personal color matching functions. A referential color matching function setting unit sets referential color matching functions. A spectral image correction unit corrects the spectral image data based on the personal color matching functions and the referential color matching functions.

7 Claims, 8 Drawing Sheets

F I G. 4 x COLOR MATCHING FUNCTION

380nm   0.11111

385nm   0.11221

⋮

780nm   0.111111 y COLOR MATCHING FUNCTION

380nm   0.22222

385nm   0.22333

⋮

780nm   0.111111 z COLOR MATCHING FUNCTION

380nm   0.33333

385nm   0.22222

⋮

780nm   0.111111

FIG. 5 x COLOR MATCHING FUNCTION

PEAK POSITION     450nm

PEAK HEIGHT       1.20

PEAK HALF-WIDTH   50nm

PEAK POSITION     600nm

PEAK HEIGHT       0.3653

PEAK HALF-WIDTH   50nm y COLOR MATCHING FUNCTION

PEAK POSITION     550nm

PEAK HEIGHT       1.0

PEAK HALF-WIDTH   150nm z COLOR MATCHING FUNCTION

PEAK POSITION     450nm

PEAK HEIGHT       2.0

PEAK HALF-WIDTH   50nm

COLOR PROCESSING APPARATUS AND METHOD THEREOF

BACKGROUND OF THE INVENTION

1. Field of the Invention

The present invention relates to color processing for correcting differences in color appearance.

2. Description of the Related Art

In order to match color representations between different media, e.g., a color displayed on a monitor and a color on a printout, various color conversion methods have been proposed. For example, in order to achieve matching of color presentations between different media, there has been proposed a method of correcting correction factors such that the XYZ value of one medium corresponds with that of the other medium.

However, color appearances on different media do not always match even when their XYZ values correspond to each other. The color matching functions defined by Commission Internationale de l'Eclairage (CIE) are based on the average values of a plurality of subjects (in other words, the vision sensitivity or chromatic vision characteristics of a standard observer), and color matching functions differ among individuals. Therefore, when an image is actually observed, its color appearances on different media do not always match.

Color matching functions are expressed as a function of light wavelength. Therefore, in order to correct the differences in color matching functions on an image with a high accuracy, it is desirable to correct the measurement data (to be referred to as spectral data or spectral image data, hereinafter) of the spectral radiance.

In addition, a technique of absorbing differences in color appearance due to differences in the human chromatic vision characteristics is also disclosed. This technique performs luminance correction on an HSV color space and color correction on an RGB color space such that the color appearance observed by one person who has chromatic vision characteristics with difficulty in distinguishing red from green becomes close to the color appearance observed by another person who has standard chromatic vision characteristics.

SUMMARY OF THE INVENTION

In the aspect, a color processing apparatus comprising: a setting section arranged to set personal color matching functions and referential color matching functions; an inputting section arranged to input spectral image data; and a corrector arranged to correct the spectral image data based on the personal color matching functions and the referential color matching functions.

According to the aspect, it is possible to correct differences in color appearance due to individual differences in color matching functions.

Further features of the present invention will become apparent from the following description of exemplary embodiments with reference to the attached drawings.

BRIEF DESCRIPTION OF THE DRAWINGS

FIGS. 3 and 4 show an example of color matching function profile data;

FIG. 5 is a view showing examples of the feature amounts of color matching functions;

DESCRIPTION OF THE EMBODIMENTS

Color processing of embodiments according to the present invention will now be described in detail with reference to the accompanying drawings.

First Embodiment

[Arrangement of Apparatus]

Figure 1:
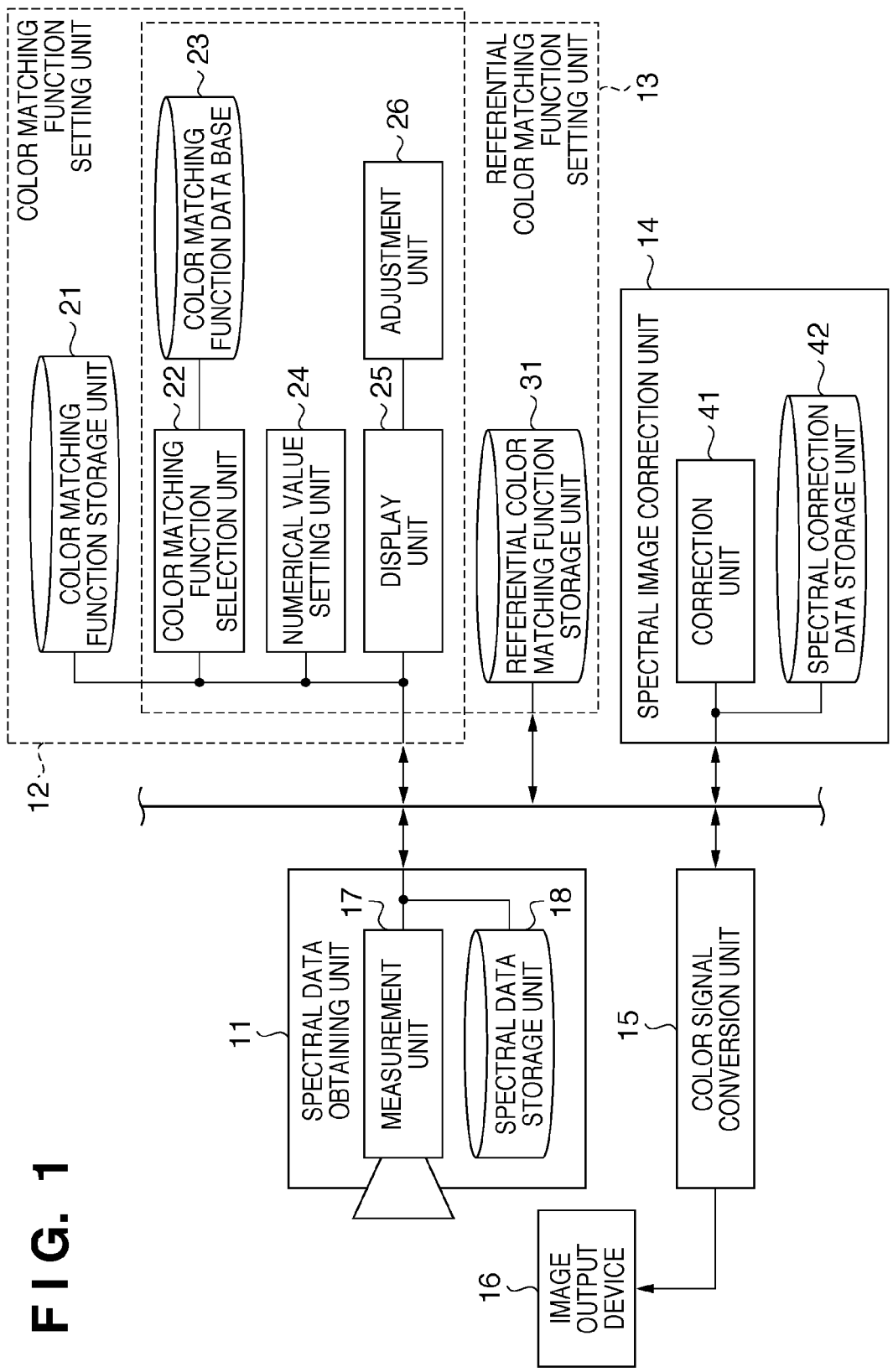
FIG. 1 is a block diagram showing the arrangement of an image processing apparatus of the first embodiment.

FIG. 1 is a block diagram showing the arrangement of an image processing apparatus (color processing apparatus) of the first embodiment.

Referring to FIG. 1, a spectral data obtaining unit 11 includes a measurement unit 17 which measures spectral data and a spectral data storage unit 18 which stores spectral data. The spectral data obtaining unit 11 can obtain the spectral image data of an object.

A color matching function setting unit 12 is used to set the profile data of personal color matching functions, and includes the following components. A color matching function storage unit 21 stores personal color matching functions. A color matching function database (DB) 23 stores one or more color matching functions. A color matching function selection unit 22 selects color matching functions from those stored in the color matching function DB 23. A numerical value setting unit 24 is used to numerically set the feature amounts of color matching functions. The set color matching functions are displayed as a graph on a display unit 25. An adjustment unit 26 provides a user interface for adjusting the shapes of color matching functions on the graph displayed on the display unit 25.

A referential color matching function setting unit 13 is used to set the profile data of referential color matching functions, and includes a referential color matching function storage unit 31 which stores referential color matching functions. Note that the above-described color matching function DB 23, color matching function selection unit 22, numerical value setting unit 24, display unit 25, and adjustment unit 26 are used to set referential color matching functions.

A spectral image correction unit 14 includes a correction unit 41 and a spectral correction data storage unit 42. The correction unit 41 is used to correct the spectral data of spectral image data stored in the spectral data storage unit 18, based on the set personal color matching functions and the set referential color matching functions. The spectral correction data storage unit 42 stores the corrected spectral image data.

A color signal conversion unit 15 converts spectral image data stored in the spectral data storage unit 18 or spectral correction data storage unit 42 into a device signal of an image output device 16 such as a printer or a monitor, and outputs it to the image output device 16. The image output device 16 displays or prints an image in accordance with the input device signal.

[Processing]

Figure 2:
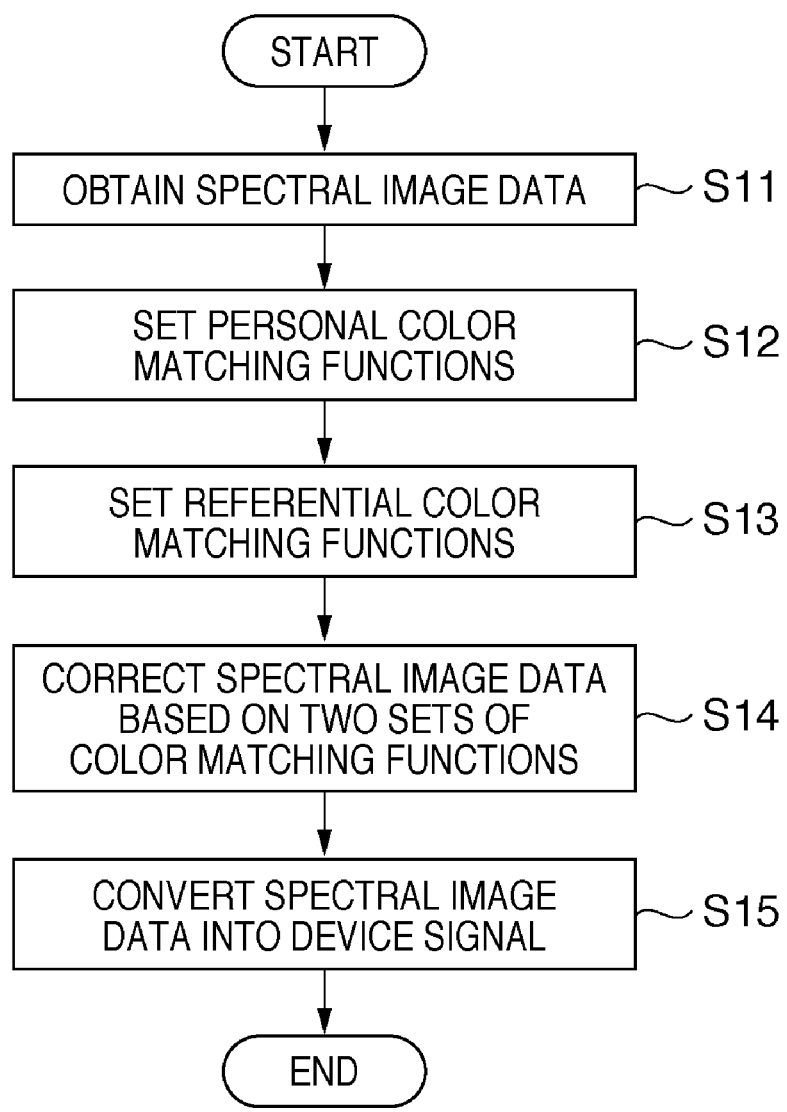
FIG. 2 is a flowchart for explaining the processing of the first embodiment.

FIG. 2 is a flowchart for explaining the processing of the first embodiment.

The spectral data obtaining unit 11 obtains the spectral image data of an object to be color-converted and output to the image output device 16, and stores the obtained spectral image data in the spectral data storage unit 18 (S11). Note that spectral image data to be processed is not limited to spectral image data which is newly measured by the measurement unit 17. Spectral image data stored in the spectral data storage unit 18 or various storage media may also be used.

The color matching function setting unit 12 sets personal color matching functions (color matching function profile data) by a method to be described later (S12).

In order to match the color appearance observed by a person who has the set color matching function profile data as the chromatic vision characteristics, to the color appearance observed by another person, the referential color matching function setting unit 13 sets the color matching function profile data of the other person as referential color matching functions by a method to be described later (S13). Note that since referential color matching functions serve as a target for matching color appearances, the color matching functions of a standard observer defined by CIE may be designated as referential color matching functions.

The personal color matching function profile data set in the past can be associated with an identification number or symbol and stored in the color matching function DB 23. When the personal color matching function profile data to be set by the color matching function setting unit 12 or referential color matching function setting unit 13 exists in the color matching function DB 23, it need not be newly set but desired data can be selected from the color matching function DB 23.

Figure 6:
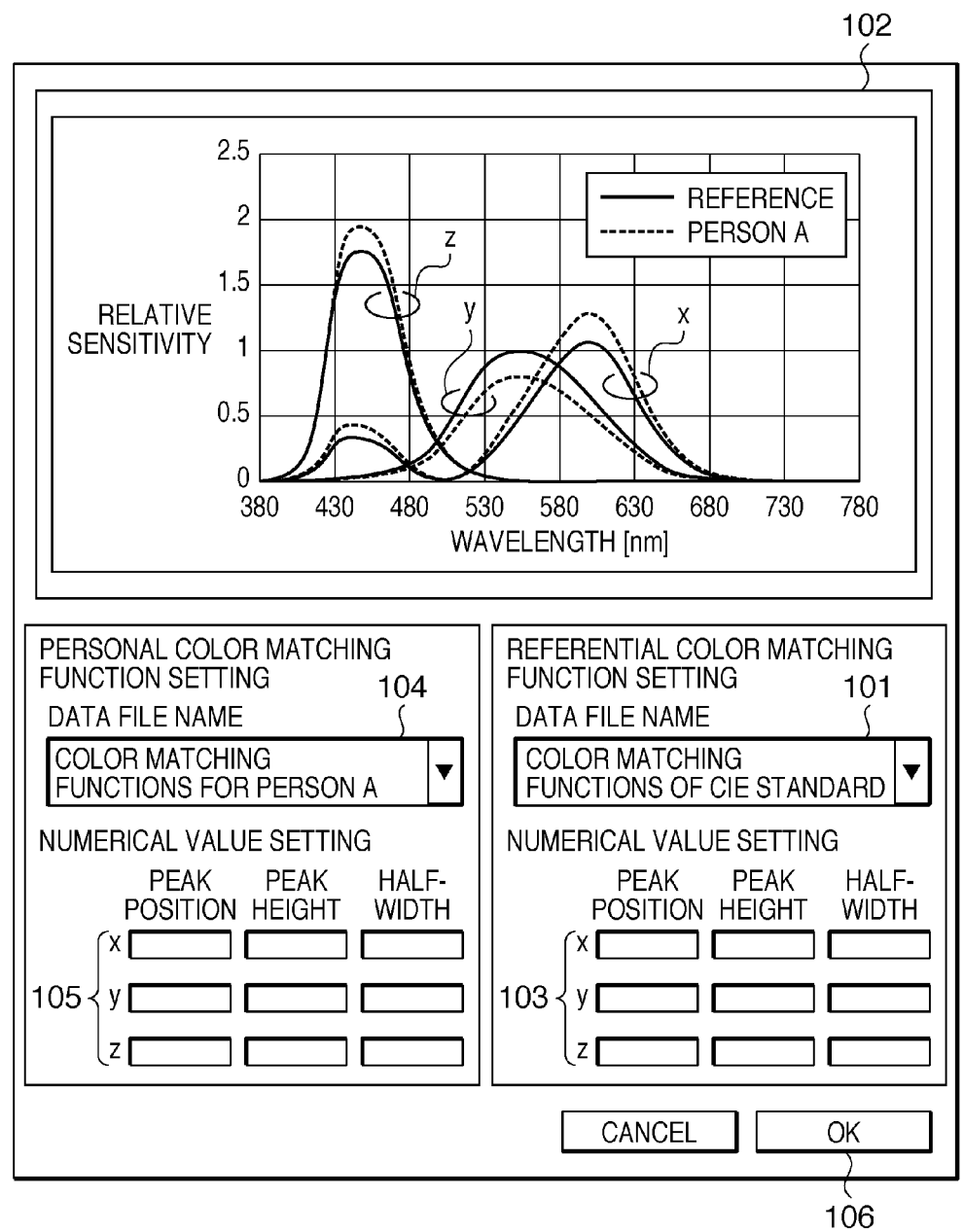
FIG. 6 is a view illustrating an example of a user interface for setting personal color matching functions and referential color matching functions.

FIG. 6 is a view illustrating an example of a user interface (UI) for setting personal color matching functions and referential color matching functions. This UI is displayed on the display unit 25 by the numerical value setting unit 24 and adjustment unit 26.

An operator operates text combo boxes 104 and 101 to select personal color matching functions and referential color matching functions from the color matching function DB 23. Alternatively, the operator operates numerical value input parts 105 and 103 to set personal color matching functions and referential color matching functions. The selected or set color matching functions are displayed as a graph on a graph display part 102. The operator can adjust the color matching functions by adjusting the shapes of the color matching functions displayed as a graph by using a pointing device such as a mouse. When the setting and adjustment of the color matching functions are completed, the operator presses an OK button 106.

When the setting and adjustment of the color matching functions are completed, the spectral image correction unit 14 corrects the spectral image data to be processed stored in the spectral data storage unit 18, based on the two sets of color matching functions, and stores the corrected spectral image data in the spectral correction data storage unit 42 (S14). This step will be described in detail later.

When the correction of the spectral image data is completed, the color signal conversion unit 15 converts the spectral image data stored in the spectral correction data storage unit 42 into a device signal of the image output device 16, and outputs it to the image output device 16 (S15). Note that conversion from spectral image data into a device signal of the image output device 16 can be performed by an arbitrary method. For example, when the image output device 16 is an RGB monitor, a device RGB signal can be obtained by using a lookup table (LUT) that describes the correspondence between the spectral image data and the device RGB value of the monitor. Alternatively, a device RGB signal may be obtained by searching for an RGB value, which reproduces the spectral image data, from a table that describes the relationship between the R, G, and B values input to the monitor and the spectral data of the light emitted by the monitor. Note that conversion from spectral image data into a device color signal is not limited to conversion into three colors such as an RGB signal, but conversion into any number of colors can be performed in accordance with the device.

Setting of Color Matching Function Profile Data

Figure 3:
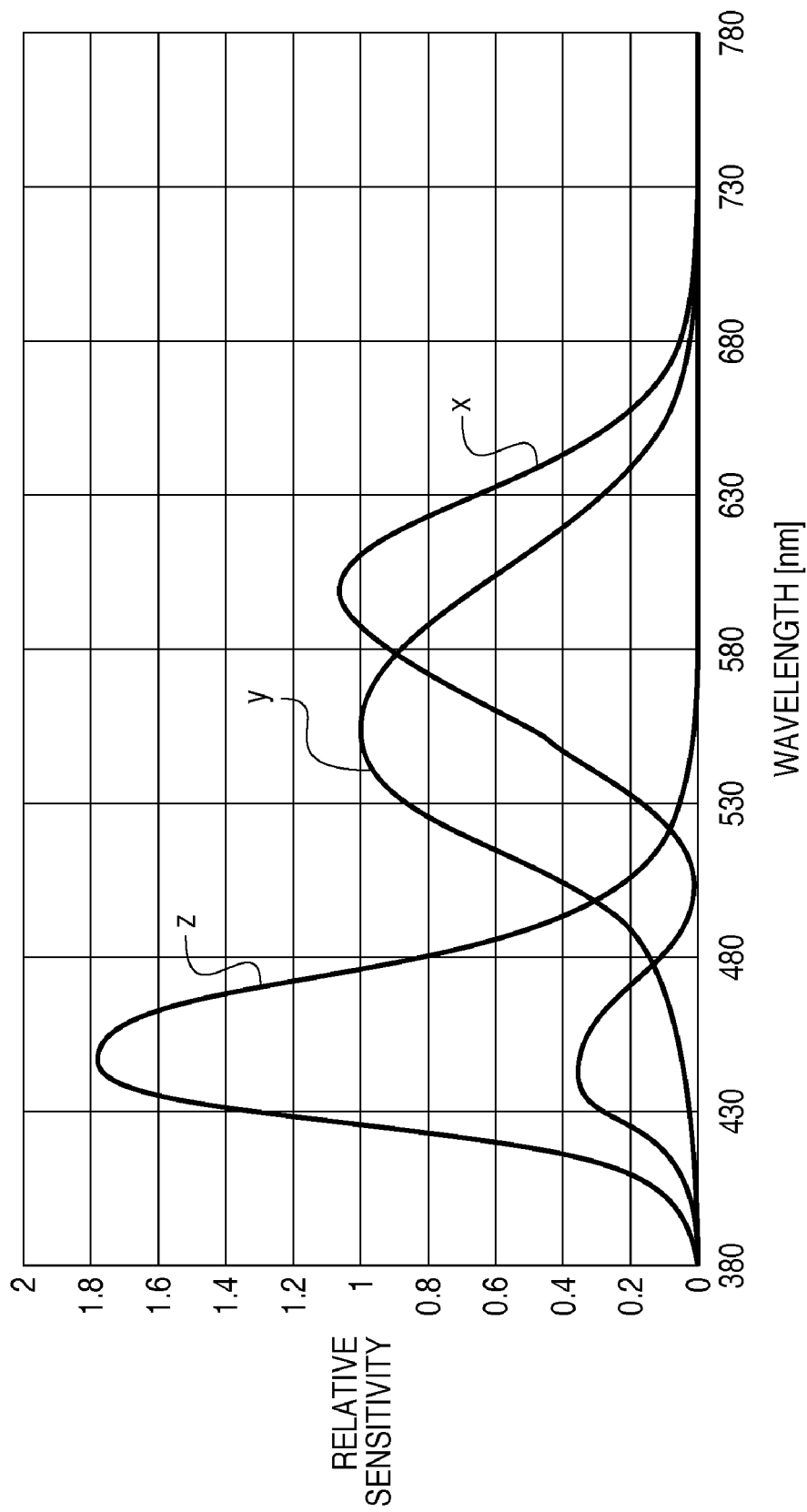

FIG. 3 is a graph showing an example of color matching function profile data. The color matching function profile data represents the relationship between the wavelength and the X, Y, and Z sensitivity characteristics. Setting of color matching function profile data is executed by one of the following methods.

In the first method, the color matching function profile data obtained by a color matching experiment or the like is stored in the color matching function DB 23. An operator operates the color matching function selection unit 22 to select required color matching function profile data from the color matching function DB 23, and the selected color matching function profile data is stored in the color matching function storage unit 21. FIG. 4 is a view showing an example of the color matching function profile data, in which the X, Y, and Z sensitivity data with respect to the wavelength are described.

In the second method, an operator operates the numerical value setting unit 24 to set the feature amounts of the color matching functions by numerical values. FIG. 5 is a view showing examples of the feature amounts of the color matching functions. The peak position, height, half-width, and the like are set for each of the x, y, and z color matching functions. The set numerical values are stored in the color matching function storage unit 21 as the color matching function profile data.

In the third method, color matching functions are displayed as a graph on the display unit 25 and its shape is adjusted by the adjustment unit 26. That is, the display unit 25 and adjustment unit 26 function as a UI for adjusting the shape of each color matching function by a mouse, keyboard, or the like. The adjusted color matching functions are stored in the color matching function storage unit 21 as the color matching function profile data.

Spectral Image Correction Unit

Figure 7:
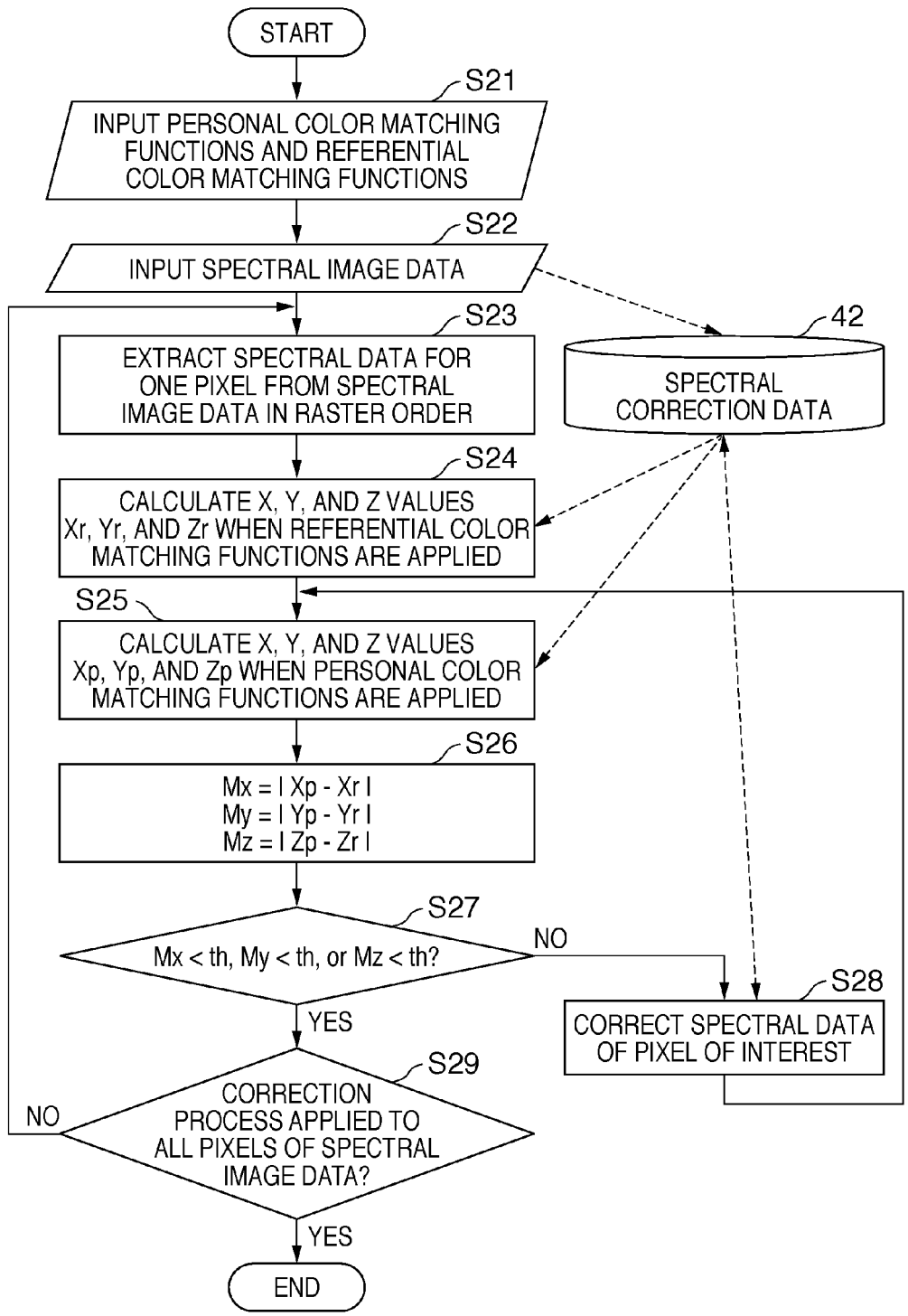
FIG. 7 is a flowchart for explaining the process of a spectral image correction unit in the first embodiment.

FIG. 7 is a flowchart for explaining the process of the spectral image correction unit 14.

The spectral image correction unit 14 inputs personal color matching functions and referential color matching functions (S21), and inputs and stores spectral image data in the spectral correction data storage unit 42 (S22).

Next, the spectral image correction unit 14 extracts spectral data for one pixel in the raster order from the spectral image data stored in the spectral correction data storage unit 42 (S23). The spectral image correction unit 14 then calculates, based on the referential color matching functions and spectral data, the color values (e.g., X, Y, and Z values Xr, Yr, and Zr) of the pixel of interest when the referential color matching functions are applied (first calculation) (S24), by using:

$$Xr = \sum_{\lambda=380}^{780} xr(\lambda) \times R(\lambda) \quad (1)$$

$$Yr = \sum_{\lambda=380}^{780} yr(\lambda) \times R(\lambda)$$

$$Zr = \sum_{\lambda=380}^{780} zr(\lambda) \times R(\lambda)$$

where $xr(\lambda)$, $yr(\lambda)$, and $zr(\lambda)$ are the referential color matching functions; and $R(\lambda)$ is the spectral data.

Next, the spectral image correction unit 14 calculates, based on the personal color matching functions and spectral image data, the color values (e.g., X, Y, and Z values Xp, Yp, and Zp) of the pixel of interest when the personal color matching functions are applied (second calculation) (S25), by using:

$$Xp = \sum_{\lambda=380}^{780} xp(\lambda) \times R(\lambda) \quad (2)$$

$$Yp = \sum_{\lambda=380}^{780} yp(\lambda) \times R(\lambda)$$

$$Zp = \sum_{\lambda=380}^{780} zp(\lambda) \times R(\lambda)$$

where $xp(\lambda)$, $yp(\lambda)$, and $zp(\lambda)$ are the personal color matching functions.

The spectral image correction unit 14 calculates the absolute values of the differences between the two sets of calculation results Xp, Yp, and Zp and Xr, Yr, and Zr, respectively (S26).

$$Mx = |Xp - Xr|$$

$$My = |Yp - Yr|$$

$$Mz = |Zp - Zr| \quad (3)$$

The spectral image correction unit 14 compares each of the absolute values Mx, My, and Mz of the differences with a threshold th (S27). When at least one of the absolute values of the differences is equal to or larger than the threshold a (Mx≧th, My≧th, or Mz≧th), the spectral image correction unit 14 corrects the spectral data of the pixel of interest stored in the spectral correction data storage unit 42, based on the sum of the absolute values Mx, My, and Mz of the differences or the differences Xp–Xr, Yp–Yr, and Zp–Zr (S28), and returns the process to step S25.

In correction of spectral data, spectral data $R(\lambda)$ is adjusted such that the Xp, Yp, and Zp values become close to the Xr, Yr, and Zr value, respectively. In adjustment of spectral data, it is preferable to adjust the spectral data over the entire wave range such that the sum of the absolute values Mx, My, and Mz of the differences becomes minimum. However, for example, when the absolute value Mx of the difference is large, the spectral data corresponding to the wavelength near the peak of the color matching function $x(\lambda)$ may be adjusted in accordance with the difference Xp–Xr.

On the other hand, when all the absolute values of the differences are smaller than the threshold th (Mx<th, My<th, and Mz<th), the spectral image correction unit 14 advances the process to step S29. Alternatively, when all the absolute values of the differences between the Xr, Yr, and Zr values calculated in step S24 and the Xp, Yp, and Zp values calculated from the spectral value corrected in step S25, respectively, are smaller than the threshold th, the spectral image correction unit 14 advances the process to step S29. Then, the spectral image correction unit 14 determines whether the above-described correction process is applied to all the pixels of the spectral image data (S29). The processing from steps S23 to S28 is repeated until the above-described correction process is applied to all pixels.

In this manner, personal color matching functions and referential color matching functions are set, the Xp, Yp, and Zp values are calculated from the spectral data by using the personal color matching functions, and the Xr, Yr, and Zr values are calculated by using the referential color matching functions. Then, spectral image data is generated that includes the spectral correction data obtained by adjusting the spectral data corresponding to each pixel of the spectral image data such that the Xp, Yp, and Zp values correspond with the Xr, Yr, and Zr values, respectively (or the difference between each corresponding two values becomes smaller than a predetermined threshold). Accordingly, it is possible to make, with a higher accuracy, the color appearance obtained when a person, who corresponds to the set personal color matching functions, observes an image displayed or printed based on the spectral correction data close to the color appearance obtained when a person, who has the chromatic vision characteristics set as the reference or the standard chromatic vision characteristics, observes the same image.

Second Embodiment

The color processing of the second embodiment according to the present invention will now be described. Note that the same components as in the first embodiment are denoted by the same reference numerals in the second embodiment, and a detailed description thereof will not be repeated.

Figure 8:
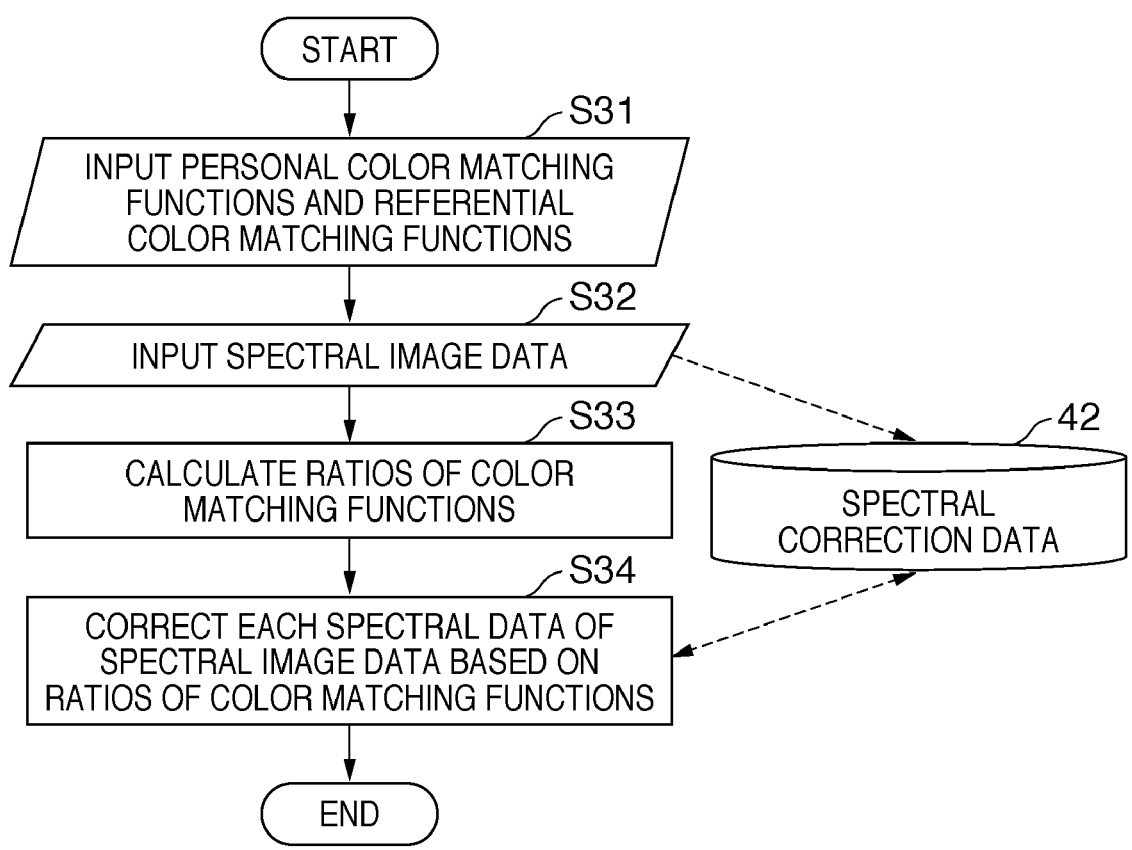
FIG. 8 is a flowchart for explaining the process of a spectral image correction unit in the second embodiment.

FIG. 8 is a flowchart for explaining the process of a spectral image correction unit 14 in the second embodiment.

The spectral image correction unit 14 inputs personal color matching functions and referential color matching functions (S31), and inputs and stores spectral image data in a spectral correction data storage unit 42 (S32).

Next, the spectral image correction unit 14 calculates the ratios of the personal color matching functions to the referential color matching functions (S33).

$$kx(\lambda) = xr(\lambda)/xp(\lambda)$$

$$ky(\lambda) = yr(\lambda)/yp(\lambda)$$

$$kz(\lambda) = zr(\lambda)/zp(\lambda) \quad (4)$$

The spectral image correction unit 14 then corrects each spectral data of the spectral image data by using the ratios calculated by equation (4) to obtain spectral correction data (S34). For example, in order to match the appearance of X, the spectral data is corrected using:

$$R'(\lambda) = R(\lambda) \cdot kx(\lambda) \quad (5)$$

where $R(\lambda)$ is the spectral data before the correction; and
$R'(\lambda)$ is the spectral data after the correction.

The X value calculated using the personal color matching function $xp(\lambda)$ and the corrected spectral image data $R'(\lambda)$ corresponds with the X value calculated using the referential color matching function $xr(\lambda)$ and the spectral image data $R(\lambda)$ before the correction, as expressed by:

$$X = \sum_{\lambda=380}^{780} xp(\lambda) \times R'(\lambda) \quad (6)$$

$$= \sum_{\lambda=380}^{780} xp(\lambda) \times R(\lambda) \cdot kx(\lambda)$$

$$= \sum_{\lambda=380}^{780} xr(\lambda) \times R(\lambda)$$

In order to match the appearances of all the X, Y, and Z, spectral data is corrected using:

$$R'(\lambda) = R(\lambda) \cdot \{kx(\lambda) \times ky(\lambda) \times kz(\lambda)\} \quad (7)$$

Note that fine adjustment may be performed after the correction by equation (7), as needed.

In this manner, the spectral data corresponding to each pixel of the spectral image data is corrected based on the ratios of the personal color matching functions to the referential color matching functions. Accordingly, it is possible to make, with a higher accuracy, the color appearance obtained when a person, who corresponds to the set personal color matching functions, observes an image displayed or printed based on the spectral correction data close to the color appearance obtained when a person, who has the chromatic vision characteristics set as the reference or the standard chromatic vision characteristics, observes the same image.

Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-237260, filed Sep. 12, 2007, which is hereby incorporated by reference herein in its entirety.

What is claimed is:

1. A color processing apparatus comprising:
a setting section, constructed to set personal color matching functions obtained by a color matching experiment and to set standard color matching functions;
an inputting section, constructed to input spectral image data;
a first calculator, constructed to calculate color values by applying the personal color matching functions to spectral data corresponding to a pixel of the input spectral image data;
a second calculator, constructed to calculate color values by applying the standard color matching functions to the spectral data; and
a generator, constructed to generate corrected spectral image data by generating spectral data corresponding to a pixel of the corrected spectral image data based on a difference between a first calculation result of the first calculator and a second calculation result of the second calculator.

2. The apparatus according to claim 1, further comprising a converter constructed to convert the corrected spectral image data into a device signal of an image output device.

3. A color processing apparatus comprising:
a setting section, constructed to set personal color matching functions obtained by a color matching experiment and to set standard color matching functions;
an inputting section, constructed to input spectral image data; and
a generator, constructed to generate corrected spectral image data by correcting spectral data corresponding to a pixel of the input spectral image data using ratios of the personal color matching functions to the standard color matching functions.

4. A color processing method comprising:
using a processor to perform the steps of:
setting personal color matching functions obtained by a color matching experiment;
setting standard color matching functions;
inputting spectral image data;
first calculating color values by applying the personal color matching functions to spectral data corresponding to a pixel of the input spectral image data;
second calculating color values by applying the standard color matching functions to the spectral data; and
generating corrected spectral image data by generating spectral data corresponding to a pixel of the corrected spectral image data based on a difference between a first calculation result of the first calculating step and a second calculation result of the second calculating step.

5. A non-transitory computer-readable medium storing a computer-executable program for causing a computer to perform a color processing method, the method comprising the steps of:
setting personal color matching functions obtained by a color matching experiment;
setting standard color matching functions;
inputting spectral image data;
first calculating color values by applying the personal color matching functions to spectral data corresponding to a pixel of the input spectral image data;
second calculating color values by applying the standard color matching functions to the spectral data; and
generating corrected spectral image data by generating spectral data corresponding to a pixel of the corrected spectral image data based on a difference between a first calculation result of the first calculating step and a second calculation result of the second calculating step.

6. A color processing method comprising:
using a processor to perform the steps of:
setting personal color matching functions obtained by a color matching experiment;
setting standard color matching functions;
inputting spectral image data; and generating corrected spectral image data by correcting spectral data corresponding to a pixel of the input spectral image data using ratios of the personal color matching functions to the standard color matching functions.

7. A non-transitory computer readable medium storing a computer-executable program for causing a computer to perform a color processing method, the method comprising the steps of:

setting personal color matching functions obtained by a color matching experiment;

setting standard color matching functions;

inputting spectral image data; and generating corrected spectral image data by correcting spectral data corresponding to a pixel of the input spectral image data using ratios of the personal color matching functions to the standard color matching functions.

* * * * *